Jan. 19, 1937.  W. W. WILSON  2,068,096
HOSE COUPLER LOCK
Filed April 13, 1936
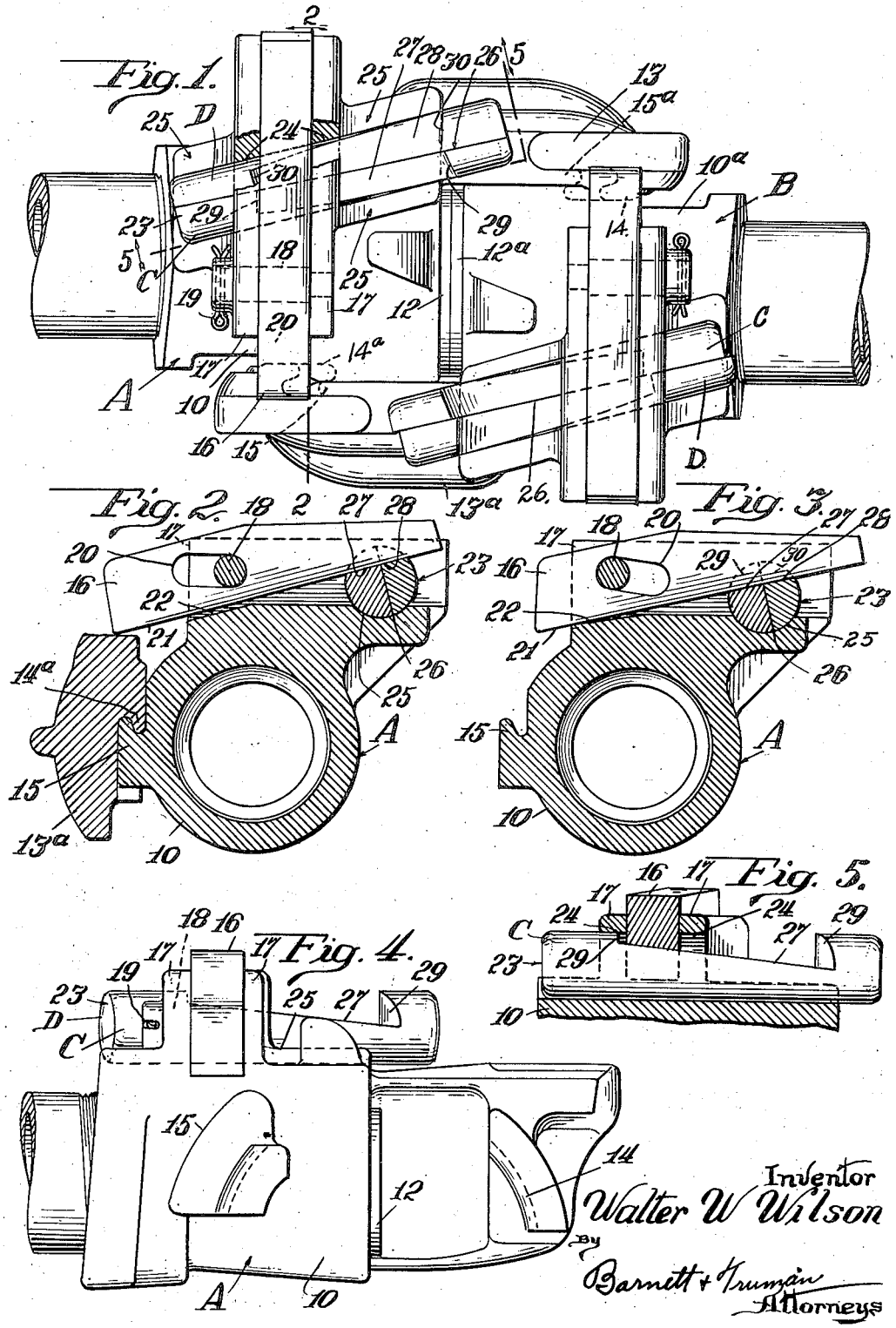
Inventor
Walter W Wilson
By
Barnett + Truman
Attorneys

UNITED STATES PATENT OFFICE 2,068,096

HOSE COUPLER LOCK

Walter W. Wilson, Oak Park, Ill., assignor to Vapor Car Heating Company, Inc., Chicago, Ill., a corporation of New York Application April 13, 1936, Serial No. 74,129

16 Claims. (Cl. 285—68)

This invention relates to couplers for connecting together the hoses or other flexible end sections of the train pipes of railway cars.

The principal object of the invention is to provide improved means for locking together the mating coupler heads of such couplers in a manner to avoid distortion or other injury to the cam arms of the head members and so as to hold the heads firmly in coupled relation and thereby avoid accidental disengagement or partial separation of the coupler heads.

A more specific object is to provide improved locking means of the above character in which a pivoted arm and a wedge cooperating therewith are employed for exerting downward pressure on the cam arm of a mating coupler; the pivoted arm being supported for lengthwise movement into its locking position without danger of distorting or otherwise injuring the cam arm of said mating coupler, and the wedge being positioned to impart tilting movement to said locking arm.

A further object is to provide in a coupler lock including a pivoted locking lever, a wedge of novel construction for applying holding pressure to said locking lever; the said wedge including separate members having frictional engagement with each other and adapted when moved with relation to each other to effect engagement with the head independently of the wedging engagement with said lever.

Other objects and advantages of this invention will be readily apparent from the detailed description of the embodiment of the invention shown in the accompanying drawing.

In the drawing:

Fig. 1 is a plan view of two coupler heads positioned in interlocking relation, each of said heads being provided with locking means constructed in accordance with this invention.

Fig. 2 is a cross sectional view taken on line 2—2 of Fig. 1.

Fig. 3 is a view similar to Fig. 2 but showing the locking arm retracted to a position to permit the cam arm of a mating coupler to be moved into locking engagement with the coupler head shown.

Fig. 4 is a side view in elevation of the coupler head shown at the left in Fig. 1; and Fig. 5 is a fragmentary sectional view taken through the coupler head on line 5—5 of Fig. 1.

The locking means of the present invention may be used in connection with couplers of various constructions. The invention has been designed, however, in view of the well known constructions of the so-called gravity hose couplers now in general use. Couplings of this character include coupler heads A and B adapted to interlock with each other in the manner indicated in Fig. 1 of the drawing. The coupler A comprises a head member 10 formed with a centrally disposed port which, when the coupler heads A and B are in interlocked relation, is held in alignment with the corresponding port of the coupler B. Gasket members 12—12a are fitted in the port openings of the couplers A and B, respectively, so as to provide a fluid-tight connection between the coupler heads. At one side of the head 10 there is formed a forwardly extending arm 13 which is provided at its outer end portion with an undercut cam lug 14 adapted to fit over and interlock with the grooved portion of a cam lug 15a on the mating coupler head 10a. The said mating coupler is also provided with a similar forwardly extending arm 13a which is provided with a correspondingly undercut cam lug 14a adapted to interlock with the cam lug 15 and the coupler head 10.

The coupler heads A and B are engaged in interlocked relation by a downward rocking movement of the arms 13—13a to engage their undercut cams with the cam lugs on the heads A and B, respectively. The downward rocking movement of the arm, together with the configuration of the coengaging cams, cause the gaskets 12—12a to be pressed tightly against each other. The coupler heads are disengaged by an upwardly rocking movement of the said arms 13—13a. In the absence of holding means other than the interlocking cams, the abnormal pull on the couplers, for example, when the cars of the train are rounding a relatively sharp curve, tends to rock the couplers about their cams in a manner to effect partial separation of the couplers. In view of the tendency which couplers of this character have to rock or to be partially separated, various locking devices have been heretofore provided for holding the cam arms in interlocking engagement with the cam lugs of the mating couplers. Considerable difficulty has been experienced, however, in devising a suitable lock which can be readily moved into and out of holding position without subjecting the cam arms of the couplers to distortion, excessive wear, or other damage. The old forms of locking means also present the further objection in that no suitable means is provided for locking the holding member in both its operative and inoperative positions. The locking device of the present invention comprises a lever 16 which extends transversely of the coupler head and is pivotally supported between the upstanding ribs 17—17 on the top of the coupler head. This arrangement of the lever makes it practicable to support it on the coupler head as distinguished from supporting elements separate from the head, and to arrange the pivotal axis thereof relatively close to the mating coupler arm, whereby the lever can be so proportioned as to exert a multiplied force on the coupler arm. The pivotal axis for the lever is a pin 18 which is fitted in suitable openings in said ribs and secured in position by means of a cotter key 19. The lever 16, in addition to pivoting about the horizontal axis 18 which extends lengthwise of the coupler head, is movable freely in the direction of its length transversely of the coupler head, into the positions indicated in Figs. 2 and 3 of the drawing. The provision for lengthwise movement together with the above mentioned transverse arrangement of the locking lever presents other important advantages over levers adapted to pivot about vertical axes, in that the lever of the present invention requires but a relatively small amount of clear space on the top of the coupler head, whereas a lever pivoted on a vertical axis must have a relatively large clear space to accommodate its arcuate movements. Fig. 2 indicates the lever positioned above the arm 13a of the mating coupler so as to exert pressure downwardly on the top portion of the arm. In Fig. 3 the lever is retracted from its locking position so as to clear the arm 13a and thereby permit the arm to be rocked or moved downwardly into interlocking engagement with the cam lug 15. The lengthwise movement of the lever 16 is obtained, preferably, by means of an elongated opening 20 in the lever which receives the pivot pin 18. The said opening is preferably inclined from the longitudinal axis of the lever so that the under surface 21 of the lever will move into closer relation with the head of the coupler when the lever is in its released position (Fig. 3), whereby the under surface of the lever can be brought into binding relation with the surface 22 of the coupler head by slight tilting movement of the lever.

The lever 16 is locked in its extended and retracted positions by means of a wedge 23 adapted to be driven between the locking lever and a portion of the coupler head. The wedge is preferably arranged to move lengthwise in a direction transversely of the lever so as to provide for convenience in driving the wedge to its locking and its releasing positions. The distance between the wedge and the pivotal axis of the lever is somewhat greater than from the said axis to the end which bears on the arm of the mating coupler. A multiplied force is therefore exerted through the lever on the said mating coupler arm to force the arm downwardly on the cam lug 15. The said wedge is preferably, though not necessarily, rounded in cross section, so that it will rotate to automatically adjust itself to provide a relatively flat bearing against the under surface of the lever 16 for various tilted positions of the lever and thereby avoid any localized contact between the cam surface of the wedge and the bottom surface of the lever. The wedge is supported in suitable openings 24 through the upstanding ribs 17—17. The top surface of the coupler head is also provided with suitable grooves serving as guideways 25—25 for the end portions of the wedge 23. The wedge 23, heretofore considered as a unit, is preferably split lengthwise of the key on a diagonal line to provide two sections. The sections are designated C and D in Fig. 1, and are provided with coengaging wedging faces 26—26.

It will be apparent from an inspection of Fig. 1 that either of the wedge sections C and D can be moved relative to the other to increase the wedging action on the surfaces 26—26. Such a movement effects a binding engagement of the wedge members in the guiding openings 24—24 and in the guiding grooves 25—25.

The top wedging surfaces 27—28 of the wedge sections C and D are preferably formed so as to provide shoulders 29—30 adapted to abut against a side face of the locking lever 16 when the sections of the key 23 are moved to the limits of the lengthwise movements.

The lever 16 and wedge sections C and D are assembled in the following manner. The wedge sections are first positioned in the guide openings. The lever 16 is then positioned between the ribs 17—17 and the pivot pin 18 is inserted. When assembled in this manner the sections C and D of the wedge 23 cannot be removed from the guide openings without first removing the lever 16.

When moving the lever 16 to its locking position, the wedge 23 is first moved in a direction to release any binding between the wedge and the lever. The lever is then moved in the direction of its length so that one end will overlie the top surface of the mating coupler arm 13a. The lever, it will be observed, may be moved to this position freely without exerting any driving or wedging force transversely of the said mating coupler arm and therefore avoid all danger of distorting or otherwise damaging the mating coupler arm. The lever 16 is then tilted to exert downward pressure on the mating coupler arm 13a by movement of the wedge 23 (both sections C and D) in a direction to cause the top surfaces 27—28 of the wedge sections to bind against the bottom surface of the locking lever. When sufficient pressure is exerted to insure firm engagement of the coupler parts either of the sections C or D of the wedge 23 may be moved with relation to the other in a manner to increase the wedging action of the surfaces 26—26 and thereby effect a binding engagement of the wedge in its guide openings, for example, in the manner indicated in Fig. 1 of the drawing, by the positions of the wedge sections on coupler head B. The use of the sectional wedge 23 makes it practical to lock the wedge in any desired position. Consequently the wedge can be locked in a position to hold the lever 16 tightly against the top surface of the mating coupler arm 13a, or can be positioned to hold the lever in its extreme released position, as shown in Fig. 3, or in any intermediate position.

While the invention is illustrated in connection with one specific embodiment it will be obvious that the principles of the invention can be embodied in structures of other forms. It will be understood, therefore, that the invention is not restricted to the specific embodiment except insofar as specific limitations appear in the appended claims.

I claim:

1. In combination, a hose coupler comprising a head formed for interlocking engagement with a mating coupler, a locking lever pivotally supported on the head and movable in the direction of its length transversely of the head into a position overlying a portion of said mating coupler, and means for tilting the lever to force one end thereof into holding engagement with said mating coupler.

2. In combination, a hose coupler comprising a head formed for interlocking engagement with a mating coupler, a locking lever pivotally supported on the head and movable in the direction of its length transversely of the head into a position overlying a portion of said mating coupler, and a wedge member for tilting the lever to force one end thereof into holding engagement with said mating coupler.

3. In combination, a hose coupler comprising a head formed for interlocking engagement with a mating coupler, a locking lever pivotally supported intermediate its ends on the head and movable in the direction of its length to position one end thereof above a portion of said mating coupler, and means for tilting the lever comprising a wedge adapted to be driven between said coupler head and the other end portion of the lever to force the first mentioned end of the lever into holding engagement with said mating coupler.

4. In combination, a hose coupler comprising a head formed with means for interlocking engagement with a mating coupler, a locking lever pivotally supported intermediate its ends on the head to tilt about a horizontal axis and adapted for movement in the direction of its length transversely of the head into a position overlying a portion of the mating coupler, and means for tilting the lever to force one end thereof into holding engagement with said mating coupler.

5. In combination, a hose coupler comprising a head formed with means for interlocking engagement with a projecting arm of a mating coupler, a locking lever extending transversely of the head and adapted to overlie said arm, a pivot pin positioned adjacent said arm and extending through the lever in a direction lengthwise of said head, there being an elongated opening in the lever for said pivot pin so as to permit longitudinal movement of the lever into and out of its locking position, and means for tilting said lever about said pivot to force one end of the lever into holding engagement with the arm of said mating coupler.

6. In combination, a hose coupler comprising a head and a projecting arm adapted to interlock, respectively with portions of the arm and head of a mating coupler, and means for holding the couplers in their interlocked engagement comprising a lever pivotally supported on the first mentioned coupler head and movable freely in the direction of its length transversely of the head to position one end thereof over said mating coupler arm and to withdraw it from said position, and a wedge movably mounted on said coupler for tilting said lever into holding engagement with said mating coupler arm.

7. In combination, a hose coupler comprising a head and a projecting arm adapted to interlock, respectively, with portions of the arm and head of a mating coupler, and means for holding the couplers in their interlocked engagement comprising a lever pivotally supported on a horizontal axis intermediate its ends on the first mentioned coupler head and movable freely in the direction of its length transversely of the coupler on which it is supported to position one end thereof above said mating coupler arm and to withdraw it from said position, and a wedge movably mounted on said coupler for wedging engagement with the other end of the lever at a location remote from the pivotal axis thereof, whereby the force exerted by the wedge is increased at the end of the lever engaging said mating coupler arm.

8. In combination, a hose coupler comprising a head formed with means for interlocking engagement with a mating coupler, a locking lever pivotally supported on the head to extend transversely thereof and movable lengthwise in one direction to a position overlying a portion of the mating coupler and movable freely in the reverse direction to a position clear of said mating coupler, and means for locking the lever in each of said positions.

9. In combination, a hose coupler comprising a head formed for interlocking engagement with a mating coupler, a locking lever pivotally supported on the head and movable to a position overlying a portion of said mating coupler, and means for tilting the lever to exert holding pressure on the mating coupler comprising a wedge member adapted to be driven between the lever and the head, means fixed on the head providing a guide for the wedge; the said wedge member comprising relatively movable sections adapted to be moved with relation to each other to effect binding engagement between the wedge and guide at any desired location of the wedge.

10. In combination, a hose coupler comprising a head formed for interlocking engagement with a mating coupler, a locking lever pivotally supported on the head and movable transversely of the head to a position overlying a portion of said mating coupler, and means for tilting the lever to exert holding pressure on the mating coupler comprising a wedge member adapted to be driven between the lever and the head, and means fixed on the head providing a guide opening for said wedge; the said wedge member comprising relatively movable sections adapted to be moved with relation to each other to effect binding engagement of said wedge sections in said guide opening.

11. In combination, a hose coupler comprising a head formed for interlocking engagement with a mating coupler, a locking lever pivotally supported on the head and movable to a position overlying a portion of said mating coupler, and means for tilting the lever to exert holding pressure on the mating coupler comprising a wedge adapted to be driven between the head and one end of said lever, and means fixed on the head providing a guide opening for the wedge, the said wedge member comprising relatively movable sections having co-engaging wedging faces and adapted to be moved with relation to each other to effect binding engagement between said wedge sections and said guide opening.

12. In combination, a hose coupler comprising a head formed for interlocking engagement with a mating coupler, a locking lever pivotally supported on the head and movable to a position overlying a portion of said mating coupler, and means for tilting the lever to hold it in its operative and inoperative positions comprising a wedge member adapted to be driven transversely of the lever between one end of the lever and the head of the coupler; the said wedge member comprising relatively movable members having co-engaging wedging faces and adapted by movement of one of said sections with relation to the other to effect a binding engagement between the wedge member and a portion of the coupler head to maintain the wedge in any adjusted position.

13. In combination, a hose coupler comprising a head formed for interlocking engagement with a mating coupler, a locking lever pivotally supported on the head and movable to a position overlying a portion of said mating coupler, and means for tilting the lever to exert holding pressure on said mating coupler comprising a wedge member supported on the head for rotational and lengthwise movement and adapted to be driven between one end of the lever and said head to force the other end of the lever downwardly against a portion of the mating coupler.

14. In combination, a hose coupler comprising a head and a projecting arm adapted to interlock, respectively, with portions of the arm and head of a mating coupler, and formed on its top surface with spaced upstanding ribs, means for bearing downwardly on the arm of the mating coupler for holding the coupler members in their interlocked relation comprising a pivoted lever positioned between said upstanding ribs and adapted to tilt about a horizontal axis and means for tilting said lever into holding engagement with the arm of said mating coupler comprising a wedge movable lengthwise in openings formed in said upstanding ribs and adapted to bear against the bottom surface of said lever; the said wedge being split longitudinally on a diagonal line to form two relatively movable sections whereby movement of one of said sections with relation to the other effects binding engagement of the wedge members in the said openings.

15. In combination, a hose coupler comprising a head formed with means for interlocking engagement with a mating coupler, a locking lever, a pivot pin extending through the lever, there being an elongated opening in the lever for said pin so as to permit lengthwise movement of the lever into and out of its locking position, the said opening being positioned at an angle to the longitudinal center of the lever whereby movement of said lever lengthwise in one direction elevates the lever with relation to the head on which it is supported and movement of the lever in a reverse direction brings it into closer relation with said head, and means for tilting said lever about said pivot to lock the same in its operative and inoperative positions.

16. In combination, a hose coupler comprising a head formed with means for interlocking engagement with a mating coupler, a locking lever pivotally supported on said head and adapted to be tilted in holding engagement with said mating coupler and means for tilting said lever comprising a wedge member adapted to be forced between one end of the lever and the said head on which the lever is supported, the said wedge being formed at opposite ends with shoulders adapted to engage the side faces of said lever to limit the movements of said wedge and thereby prevent removal of the wedge without first removing the lever from its pivotal support.

WALTER W. WILSON.